Oct. 6, 1942.　　　E. JANETSCHKE　　　2,298,130
FREQUENCY CONVERTER
Filed May 1, 1941　　　2 Sheets-Sheet 1
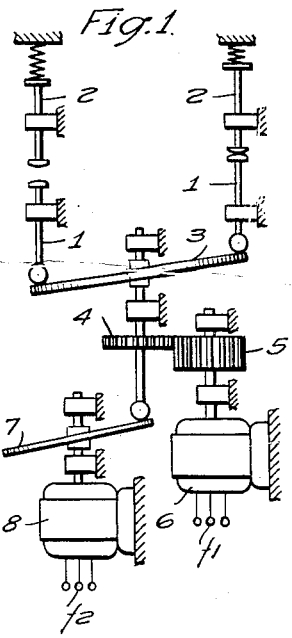
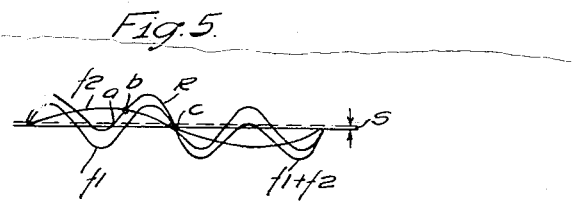
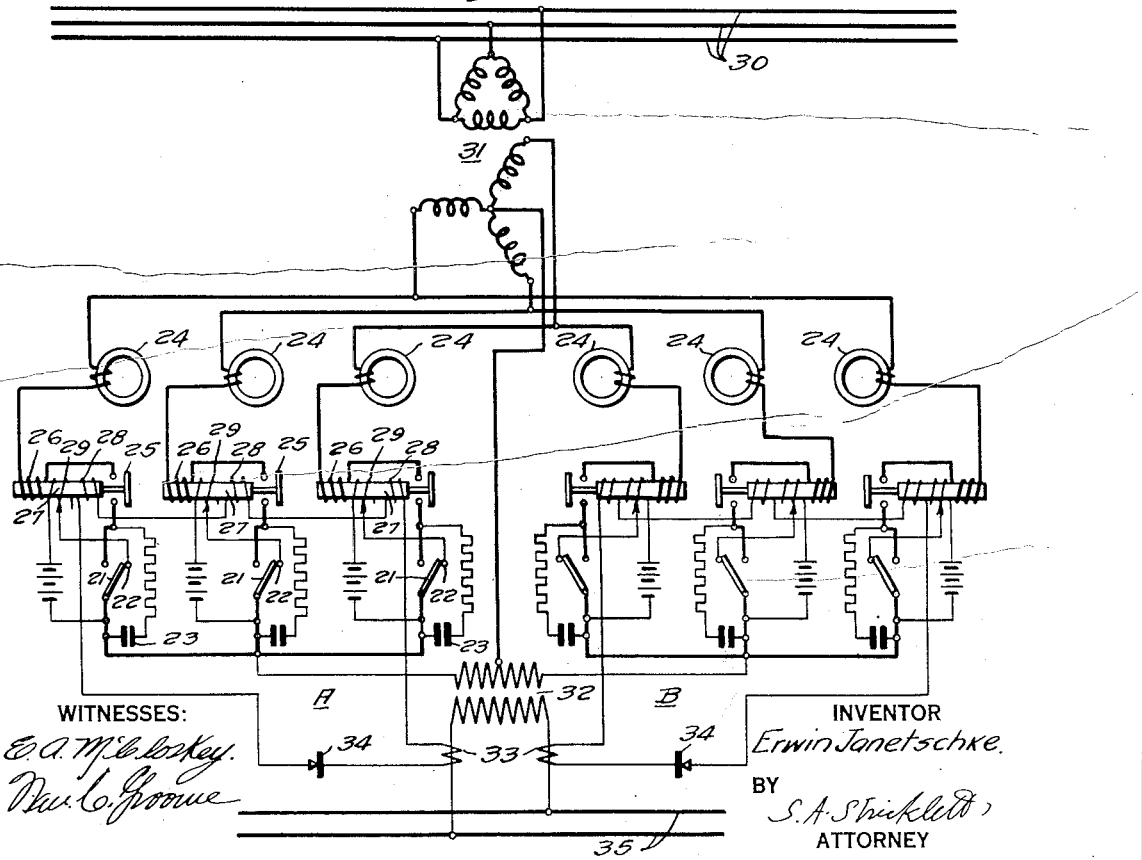
WITNESSES:　　　　　　　　　　　　　　　　INVENTOR
E. A. McCloskey.　　　　　　　　　　　　Erwin Janetschke.
　　　　　　　　　　　　　　　　　　　　BY
　　　　　　　　　　　　　　　　　　　S. A. Stricklett
　　　　　　　　　　　　　　　　　　　　ATTORNEY Oct. 6, 1942.   E. JANETSCHKE   2,298,130
FREQUENCY CONVERTER
Filed May 1, 1941   2 Sheets-Sheet 2

WITNESSES:
E. A. M'Closkey.
Wm. C. Groome

INVENTOR
Erwin Janetschke.
BY
S. A. Stricklett
ATTORNEY

Patented Oct. 6, 1942

2,298,130

UNITED STATES PATENT OFFICE 2,298,130

FREQUENCY CONVERTER

Erwin Janetschke, Berlin-Charlottenburg, Germany, assignor to Westinghouse Electric & Manufacturing Company, East Pittsburgh, Pa., a corporation of Pennsylvania Application May 1, 1941, Serial No. 391,266
In Germany January 23, 1940

11 Claims. (Cl. 172—281)

My invention relates to a frequency conversion system and particularly to such a system utilizing mechanical contactors for establishing the conducting paths between the two frequency circuits.

It has recently been possible to construct practical converters for voltage and current conversion by means of mechanically activated switching contacts. The solution involves the use of so-called switching reactors; i. e., reactors which are connected in series with the switching contacts and which have a very high inductance in the unsaturated state, a flow of a very weak current being sufficient, however, to saturate the core of such a reactor, so that as a result the inductance will drop to a very low value.

Arcing at the contacts when the latter are opened or closed can be completely avoided by using said switching reactors, especially when in addition shunting paths are provided in parallel with the contacts, for the purpose of making possible a flow of weak currents through the switching reactors when the contacts are open. Furthermore, by virtue of the presence of the switching reactors, the instants at which the contacts are caused to close can be shifted at will to any point within the range of the alternating current-voltage cycle, although under certain conditions this may require that the switching reactors be equipped for operation with an adjustable superposed magnetization.

It is in principle possible, therefore, to design a contactor rectifier outfit that can operate as a frequency converter and convert alternating currents and voltages of given frequency into corresponding quantities having another frequency whose value can be adjusted at will. By using properly selected portions of the voltage curves representing the primary or input alternating current voltage, curves for the secondary or output voltage can be obtained in this case which, on the average, will have the desired sinusoidal shape.

The present invention relates to a frequency converter of the kind just referred to, and deals more in particular with the arrangement to be provided for actuating the switching contacts. In accordance with the present invention, the drive for the contact mechanisms is so arranged that the contacts will close at the instants at which the sum of two quantities—one that varies in synchronism with the primary frequency, and another that varies in synchronism with the secondary frequency—becomes greater than a definite, predetermined value. This arrangement is such that the process of frequency conversion will be a flexible one, so that the process of transferring the current with the required modification in curve-shape can be carried out with the means just referred to, even when the ratio of the frequencies of the two network systems that are being interconnected by the converter fluctuates considerably.

The invention can be applied in practice with the aid of purely mechanical means, by imparting to the contacts motions produced by the superposition of two reciprocating component-motions, the frequency of one of these two component-motions being equal to the primary system-frequency, and that of the other component-motion being equal to the secondary system-frequency. The so-called wabble-disc and the eccentric shaft have been found to be quite appropriate motion-transmitting members for actuating the contacts. With either one of these two members, the drive can be so arranged that it comprises, in addition to a wabble-disc or an eccentric disc that rotates at a speed corresponding to the primary frequency, a second motion-transmitting member of the same kind which rotates at a speed corresponding to the secondary frequency and which imparts to the first wabble-disc or eccentric disc an additional reciprocating or eccentrically rotational motion. It is equally well possible, however, to apply the underlying inventive thought when an electromagnetic drive must be provided for actuating the contacts. In this case, the switching contacts can be equipped with closing magnets which are energized by two voltages at the two frequencies mentioned above and which are so dimensioned that they will bring the contacts into the closed positions as soon as their total excitation exceeds a definite, predetermined value. Further details of the present invention are revealed by the attached drawings, in which:

Figure 1 is a schematic illustration of one form of contactor device according to my invention;

Fig. 4 is a schematic illustration of the connections according to my invention; and Fig. 5 is a diagrammatic illustration of the operating factors in my invention.

Figure 2:
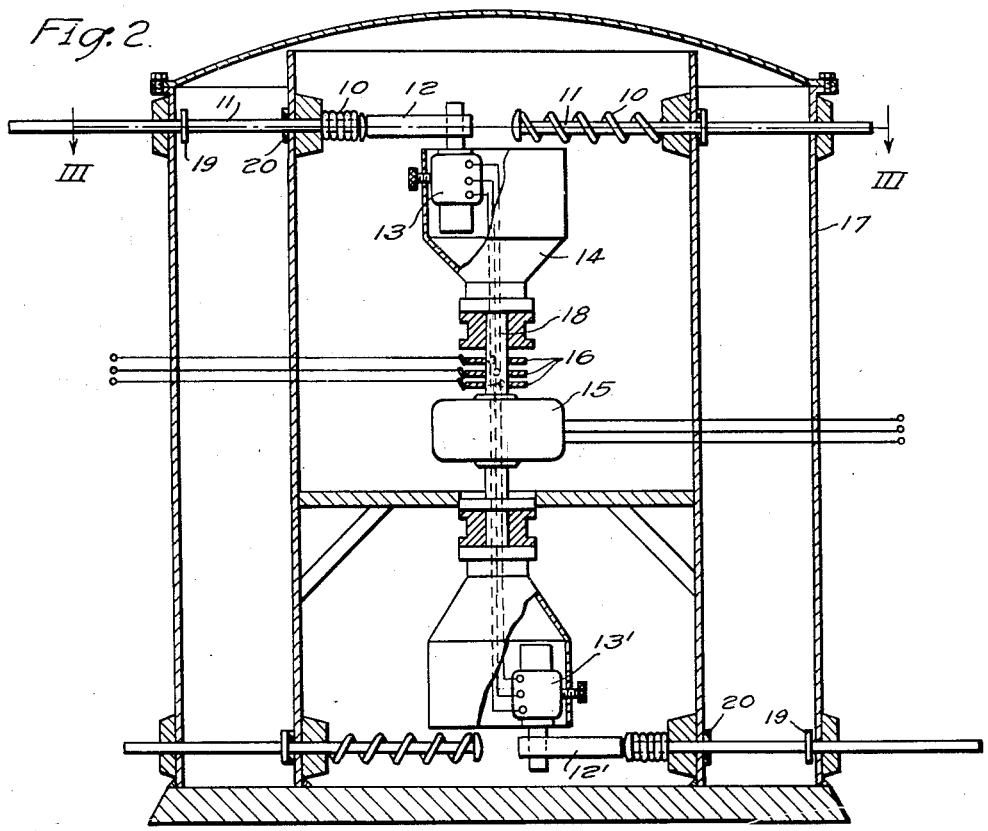
Fig. 2 is an elevation partially in section of a further modification of a contactor arrangement according to my invention.
Figure 3:
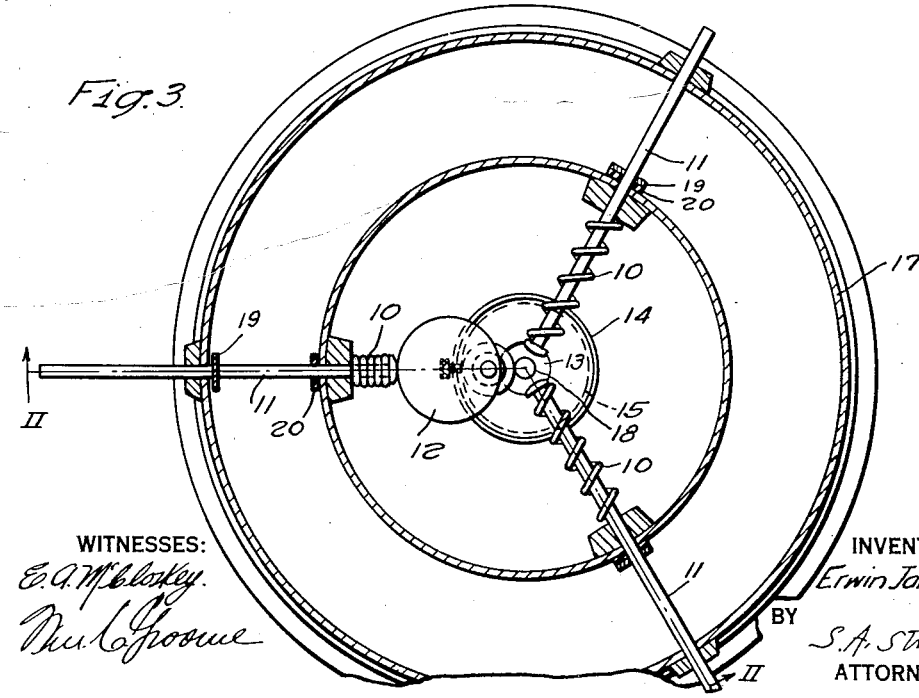
Fig. 3 is a partial plan view of a portion of the contactor drive of Fig. 2, showing the relation of the parts.

In the case of the example of application illustrated by Fig. 1, the contacts are actuated by means of a wabble-disc. The contact-stems or tappet rods, which are displaceable in the directions of their longitudinal axes and whose top-ends carry contact-members, are designated by 1. When a contact-stem is lifted over a certain distance, its contact-member comes into contact with a spring-loaded stationary contact 2. The schematically represented wabble-disc 3 causes the contact-stem 1 to perform the required vertical reciprocating motion. This disc is driven by a motor 6 at a speed corresponding to the primary frequency $f_1$. The gear-transmission inserted between the motor and the wabble-disc is so designed that gear-wheel 4 can be shifted in the axial direction with respect to gear-wheel 5, without affecting the meshing of the two gear-wheels. And the wabble-disc 3 is so supported in its bearings as to make the axial shift possible. A second wabble-disc 7 imparts to the shaft of the wabble-disc 3 a reciprocating motion having a frequency equal to the frequency $f_2$ of the currents that energize the synchronous motor 8 for driving the wabble-disc 7. As a result, the total linear displacement imparted to each contact-stem 1 becomes equal to the sum of the displacements produced by the rotation of the wabble-disc 3 at the frequency $f_1$ and the displacement produced by the rotation of the wabble-disc 7 at the frequency $f_2$. The contacts close at the instants at which said total displacement exceeds a given value. Instead of providing between the wabble-disc 3 and its driving motor a gear transmission permitting the axial shift mentioned above, it is possible to obtain the same effect by driving this disc with the aid of a flexible shaft.

Another mechanical form for an arrangement in accordance with the present invention, involving the use of eccentrics as driving members, is schematically represented in Fig. 2. Here the contact-stems 11, which form a star-shaped assembly inside the housing 17, are displaceable in the radial sense. To the contact-stems 11 are fastened contact-members 19 that will establish a conductive connection between the two contact-units of stationary twin-contact-members 20 as soon as the contact-stem in question is released by the eccentric 12 and its axial displacement reduced to zero by a restoring force which, on the drawings, is supposed to be produced by a spring 10. The eccentric 12 is driven by a motor 13 at a speed corresponding to the primary frequency. The motor 13, in turn, is supported eccentrically with respect to a shaft 18, and this shaft is driven by a motor 15 at a speed corresponding to the secondary frequency. Current is supplied to the motor 13 by means of collector rings 16. The motor 13 is supported in a housing 14, in such a manner that the eccentricity $e$ of this motor is adjustable in magnitude. The assembly of actuating and contact-making members just described is located at the top-end of the motor 15; a duplicate of this assembly is coupled with this motor at the bottom-end of the latter. The eccentric of this duplicate assembly is designated by $12^1$, and its driving motor by $13^1$; for the sake of simplicity, the contact-stems of the lower assembly have been omitted from the drawings. The reason why the assembly of contact-making members is provided in duplicate is that in order to make possible the asynchronous operation of the outfit with a gradual transition from the positive to the negative half-wave of the secondary or output voltage, separate sets of switching contacts must be provided for producing the positive and for producing the negative half-wave of this voltage. Here again the resultant displacement of each contact-stem 11 is composed of two component-displacements produced by two motions having different frequencies. It is necessary, however, that the displacement (stroke) produced by the motion taking place at the secondary frequency be shorter than the displacement (stroke) equal to the eccentricity of the disc 12 and produced by the rotation of this disc, which takes place at the primary frequency. The secondary or output voltage can be controlled by adjusting the magnitude of the eccentricity $e$. The magnitude of this voltage will become equal to the maximum value obtainable from the given wave-shape curves of the primary voltage when the eccentricity $e$ is made equal to the eccentricity $a$ of the disc 12. When the eccentricity $e$ is reduced in magnitude down to the vanishing point, the magnitude of the secondary or output voltage will be reduced in the same ratio, down to zero.

The schematic diagram for a contact rectifier outfit operating as a frequency converter and embodying the features covered by the present invention is given in Fig. 4. The converter shown is used for converting the three-phase voltage supplied by a distribution network 30 into a single-phase voltage of different frequency, which is supplied to a network 35. The converter consists of two units A and B which are duplicates in every respect and which are connected to transformer 31 of the outfit; one converter-unit produces the positive, and the other converter-unit produces the negative half-wave of the secondary or output voltage. The switching contacts, which can be actuated either purely mechanically or electromagnetically, in the manner outlined in the foregoing, are designated by 21. Switching reactors 24 are connected in series with these contacts, and in addition shunting paths 23, consisting of resistors and capacitors, are connected in parallel with them.

In series with each main contact 21 is connected an additional contact 25 which has the task of interrupting again the phase-wire connection in question. For an examination of the intervals of closure of the main contacts 21, as determined by the relationships indicated in the foregoing, will reveal the fact that these intervals are sometimes much longer than required for producing the desired flow of current upon the closure of the contact and for properly commutating the current. In fact, the interval of contact-closure must last only up to the instant at which the process of transferring the current to the next phase will be completed, and the preceding phase must be interrupted within the interval during which the switching reactor 24 provided in the phase-wire connection in question will be unsaturated.

The conditions just stated cannot be met by the main contacts 21 without the use of additional means. This will be recognized after an examination of the diagram shown in Fig. 5. In this diagram, the two linear component-motions of a contact-stem are graphically represented as functions of the time by the curves $f_1$ (motion corresponding to the primary frequency) and $f_2$ (motion corresponding to the secondary frequency), the resultant motion being represented by curve R. Assuming that a displacement $s$ of the contact-stem is required in order to close the contact, the latter will be kept closed by the drive for a length of time corresponding to a portion of the curve R for which the ordinate is longer than $s$. For instance, the contact for which the curves have been drawn will close at point $a$. But it follows from the diagram reproduced below the one to which reference is being made; i. e., from the diagram which shows the complete wave of the secondary or output voltage that the next phase commences to carry current already at the point $b$. In other words, it is necessary that the contact in question be opened again at a time-instant having a time-lag with respect to the point $b$ which is equal to the length of the commutation interval, while actually said contact is kept closed by the drive beyond said time-instant, as revealed by curve R.

It is necessary, therefore, to provide the auxiliary contacts 25, and to control these contacts in such a manner that they will interrupt the phases to which they belong at the proper instants. It is assumed in Fig. 4 that the auxiliary contacts 25 are held magnetically in the closed position, by means of holding coils 26. Each holding coil is energized by the phase-current, so that the corresponding auxiliary contact 25 will open at the instant at which the magnitude of the phase-current, while approaching zero, drops below a certain minimum value. It is equally well possible, however, to control the opening of the auxiliary contacts 25 in some other way. For instance, these contacts can be caused to open at the end of an interval of time of definite length, a length that is either constant and equal to the maximum length of the commutation interval, or variable and dependent on the intensity of the load current. Or else the auxiliary contacts can be controlled by means of voltages and currents which are produced in the form of, or produced by, a modulated voltage generated at the frequencies $f_1$ and $f_2$. In generating the latter voltage, it is not necessary in the case of the three-phase single-phase converter to which reference is being made that the wave of frequency $f_1$, be in phase with the phase-voltage that is being applied to the corresponding set of contacts; in fact, said wave may have a definite angular phase-displacement with respect to the latter voltage.

In order to make that the various phase-circuits will be in the proper operating condition, the auxiliary contacts 25 must be caused to close before the corresponding main contacts close. The proper closing of the auxiliary contacts can be secured in various ways. For instance, the auxiliary contacts 25 can be mechanically coupled or interlocked with the corresponding main contacts 21 in a manner such that they will close at the instants at which the corresponding main contacts open in accordance with the control schedule as determined by the functioning of the actuating means for their contact-stems. The same effect can be produced electrically, however, with the aid of auxiliary control circuits. The latter means have found application in Fig. 4. Here the main contacts 21 are equipped with auxiliary contacts 22 which close immediately after the opening of the corresponding main contact, thus initiating a flow of current in an energizing coil 29 which will close the corresponding auxiliary contact 25.

On the cores 27 of the holding coils 26 for the auxiliary contacts 25 are mounted in addition coils 28 that are energized by currents whose intensities depend on the load current and which are supplied to these coils by current transformers 33 through valve-elements 34. These additional coils are provided for the purpose of causing the auxiliary contacts to remain open during those half-waves of the secondary or output voltage that are produced by the other unit of the converter, and of thus avoiding any unnecessary functioning of these contacts.

In those instances where the main contacts are controlled electromagnetically, the use of said auxiliary contacts can be avoided altogether, because in such an instance it is readily possible to cause the main contacts to interrupt their phase-circuits in accordance with a control schedule that is a duplicate of the one carried out by the auxiliary contacts in the case of an outfit having purely mechanically actuated main contacts. But when said practice is resorted to when the main contacts are controlled electromagnetically, there is some danger that hunting may occur, i. e., that a closing pulse may be imparted to the contacts immediately after they open, and so on. How the hunting may be produced can be explained from Fig. 4, if the curves shown in this diagram are considered as representing the energizing voltages applied to the closing magnet of one of the contacts. The diagram shows in fact that the closing conditions are favorable as long as the resultant curve R has ordinate-values larger than $s$. It is necessary, therefore, to impose an additional condition in accordance with which the closing motions of the contacts must be produced. This additional condition may be formulated, for instance, as follows. A contact should close not when the total excitation supplied to the closing coil merely exceeds a definite, predetermined value, but only when said excitation exceeds the latter value after having had prior to this instant values that were smaller than said limiting value. In other words, the coil must close the contact only when the total excitation exceeds the limiting value while its representative point passes along the excitation curve from points whose ordinates are smaller towards points whose ordinates are larger than the ordinate corresponding to the limiting value. If, for instances, the contact closes at the point $a$ and subsequently opens at the point $b$, at the end of the commutation interval, the resultant excitation will continue to have, up to the point $c$, a magnitude exceeding that required for closing the contact. But within this interval following the opening of the contact, a reclosure of the latter must be prevented. The contact must not close again until after said representative point, upon passing through the point $b$ and while moving along a raising portion of the curve R, reaches again a point of this curve for which the ordinate is equal to $s$.

It should finally be noted with reference to Fig. 4 that the arrangement shown in this diagram is only one example of a possible arrangement embodying the features covered by the present invention. For it is self-evident that the present invention can be applied equally well in conjunction with other converter-arrangements. For instance, the invention can still find application in instances where the transformer 32 on the output-side is omitted and the arrangement is modified somewhat in order to make this omission feasible. The arrangements can further be adapted to the production of polyphase voltages on the secondary or output side, and the schemes utilizing neutral-point connections can be replaced by schemes utilizing the so-called Graetz connections.

I claim as my invention:

1. A frequency converter for converting alternating currents and voltages of given frequency into corresponding quantities having another frequency, comprising a plurality of contactor rectifiers, each rectifier including a plurality of switching contactors, a switching reactor in series with each of said contacts, a source of motion synchronous with the given frequency, a source of motion synchronous with the second frequency, means for superimposing one of said motions on the other and means responsive to the sum of said motions for controlling said contactors.

2. In a frequency converter for converting alternating currents of a given frequency into alternating currents of a different frequency, a switching contactor device comprising a plurality of switching contacts, contactor stems for operating said switching contacts, a wabble-disc for actuating said contactor stems, a shaft in said wabble-disc, said shaft being longitudinally movable to displace said wabble-disc, a second wabble-disc for controlling the longitudinal displacement of said shaft, means for rotating said second wabble-disc in synchronism with one of the two frequencies and means for rotating said shaft in synchronism with the other frequency.

3. Converter outfit as per claim 2, characterized by the feature that the means for rotating said shaft includes a gear secured to said shaft, a driving gear meshed with said first mentioned gear, a motor for actuating said driving gear, at least one of said gears being of a width permitting axial shifting of the other gear along the gear teeth without disengaging the gears.

4. In a frequency converting system for transferring energy between two circuits of different frequency, a switching contact device comprising a plurality of contactors, an eccentric cam for actuating said contactors, means for operating said cam at a speed corresponding to one of the frequencies, said cam being eccentrically mounted on a rotating body and means for rotating said body at a speed corresponding to the second frequency.

5. Converter outfit as per claim 4, characterized by means for varying the eccentricity of the cam mounting for adjusting the stroke of the motion taking place at the secondary frequency.

6. A frequency converting system comprising a polyphase supply circuit, an alternating current load circuit, a plurality of parallel connected contactor devices for successively establishing conductive relation between said circuits, each of said contactor devices including a plurality of switching contacts corresponding to the phase-circuits of the supply circuit, a plurality of coacting actuating devices for actuating said switching contacts, one of said actuating devices having a position dependent on the frequency of the supply circuit and the other having a position dependent on the frequency of the load circuit, an auxiliary switching device in series with each of said switching contacts and means for opening said auxiliary switching device after commutation of the current at the switching contact.

7. A frequency conversion system comprising a plurality of mechanical contactor converters for successively connecting two circuits of different frequency each contactor converter comprising a plurality of contact elements, reciprocating plungers for controlling said contact elements, coacting driving means for said plungers, one of said driving means operating in synchronism with the frequency of one of said circuits and the other in synchronism with the frequency of the other of said circuits.

8. A frequency converter for converting an alternating current of a given frequency to an alternating current of a second frequency comprising a plurality of contactor rectifiers each contactor including a plurality of switching contactors, means for actuating said contactors including a source of reciprocating motion synchronized with the given frequency, a second source of reciprocating motion synchronized with the second frequency, means for mechanically securing the sum of said reciprocating motions and means responsive to the sum of said motions for actuating said contactors.

9. In a frequency converting system for transferring electrical energy between two alternating circuits of different frequency, a switching contact device comprising a plurality of contactors, an eccentric cam for actuating said contactors, means for rotating said cam at a speed determined by the frequency of the circuit of higher frequency, a rotating mounting for said cam, said cam being eccentrically mounted on said rotating body, the eccentricity of said mounting being less than the throw of said cam, and means for rotating said mounting at a speed determined by the frequency of the low frequency circuit.

10. A frequency converting system comprising a polyphase supply circuit, a single phase circuit, a plurality of parallel connected contactor devices for establishing conductive relation between said circuits, each of said contactor devices including a plurality of switching contacts corresponding in number to the phase circuits of the polyphase circuit, a plurality of coacting actuating devices for actuating said switching contacts, one of said actuating devices having a position dependent on the frequency of the polyphase circuit and the other having a position dependent on the frequency of the single phase circuit, an auxiliary switching device in series with each of said switching contacts, holding magnets for each of said auxiliary switching devices, said holding magnets being deenergized when the current flowing in the associated phase circuit drops below a predetermined minimum.

11. A frequency converting system comprising a polyphase supply circuit, a single phase circuit, a plurality of parallel connected contactor devices for establishing conductive relation between said circuits, each of said contactor devices including a plurality of switching contacts corresponding in number to the phase circuits of the polyphase circuit, a plurality of coacting actuating devices for actuating said switching contacts, one of said actuating devices having a position dependent on the frequency of the polyphase circuit and the other having a position dependent on the frequency of the single phase circuit, an auxiliary switching device in series with each of said switching contacts, holding magnets for each of said auxiliary switching devices, said holding magnets being deenergized when the current flowing in the associated phase circuit drops below a predetermined minimum, an auxiliary contact on each of said switching contactors and a closing coil energized through said auxiliary contact for reclosing said auxiliary switching device upon opening of said switching contactor.

ERWIN JANETSCHKE.